United States Patent [19]
Fukuda et al.

[11] Patent Number: 5,635,436
[45] Date of Patent: Jun. 3, 1997

[54] VOLTAGE-DEPENDENT NONLINEAR RESISTOR CERAMICS

[75] Inventors: Masaru Fukuda, Kitakyushu; Tadashi Ogasawara, Akita; Toshio Marui, Akita; Dai Matsuoka, Akita, all of Japan

[73] Assignee: TDK Corporation, Tokyo, Japan

[21] Appl. No.: 661,791

[22] Filed: Jun. 13, 1996

[30] Foreign Application Priority Data

Jul. 21, 1995 [JP] Japan ................................ 7-185754

[51] Int. Cl.$^6$ ................................................ C04B 35/46
[52] U.S. Cl. ........................... 501/138; 501/139; 252/518
[58] Field of Search .................... 501/138, 139; 252/518

[56] References Cited

U.S. PATENT DOCUMENTS

| | | | |
|---|---|---|---|
| 4,753,906 | 6/1988 | Nishigaki et al. | 501/138 |
| 5,086,021 | 2/1992 | Sasaki et al. | 501/138 |
| 5,248,640 | 9/1993 | Sana et al. | 501/138 |

FOREIGN PATENT DOCUMENTS

| | | |
|---|---|---|
| 2-303015 | 12/1990 | Japan . |
| 3-45559 | 2/1991 | Japan . |
| 3-262103 | 11/1991 | Japan . |

*Primary Examiner*—Deborah Jones
*Attorney, Agent, or Firm*—Oblon, Spivak, McClelland, Maier & Neustadt, P.C.

[57] ABSTRACT

A voltage-dependent nonlinear resistor or varistor ceramic composition consists essentially of (1) an oxide of the formula: $\{Sr_{(1-x-y)}Ba_xCa_y\}_zTiO_3$ wherein $0.3 < x \leq 0.9$, $0.1 \leq y \leq 0.5$, $x+y \leq 1$, and $0.84 < z < 1.16$, (2) 0.001 to 5.000 mol % of at least one oxide of niobium, tantalum, tungsten, manganese or R wherein R is yttrium or lanthanide, (3) 0.001 to 5.000 mol % of $SiO_2$, and (4) 0.001 to 5.000 mol % of MgO. When the varistor voltage is controlled by changing a re-oxidizing temperature without changing the composition, a satisfactory nonlinear index $\alpha$ is available over a wide range of varistor voltage. The dependency of varistor voltage on heat treating temperature is reduced.

2 Claims, 1 Drawing Sheet

DEPENDENCY OF E10 ON
RE - OXIDIZING TEMPERATURE

VOLTAGE-DEPENDENT NONLINEAR RESISTOR CERAMICS

BACKGROUND OF THE INVENTION

1. Field of the Invention

This invention relates to a voltage-dependent nonlinear resistor which is often referred to as a varistor, and more particularly, to a ceramic composition for use in varistors comprising strontium, barium, calcium, and titanium as main ingredients.

2. Prior Art

Varistors are resistor elements whose resistance varies in a nonlinear relationship to a change of applied voltage, and more particularly, resistor elements whose resistance drops abruptly when a voltage in excess of a certain value is applied. Various varistors have been used in electronic equipment in order to accommodate or remove abnormal voltage and noise occurring therein.

For example, varistors based on strontium and titanium have a capacitor function in addition to the nonlinearly changing resistance and are adequate for accommodating or removing abnormal voltage and noise. These varistors, however, suffer from the problem that the varistor voltage at which resistance drops abruptly lowers as the temperature rises. Therefore, the increasing ambient temperature or self heat release can cause the varistors to induce overcurrent or thermal runaway.

One solution is disclosed in JP-A 45559/1991 as a varistor comprising strontium, barium, calcium, and titanium as main ingredients. Since the varistor voltage increases or remains substantially unchanged as the temperature rises, this varistor restrains the potential overcurrent and thermal runaway resulting from the increasing ambient temperature or self heat release. The varistor preparing process involves heat treatment of a sintered semiconductor ceramic for re-oxidation. A varistor exhibiting a desired varistor voltage is then obtained by properly setting the treating temperature. Therefore, varistors having different varistor voltages can be obtained from a common semiconductor ceramic material by carrying out heat treatment at different temperatures.

The performance of varistors is represented by a nonlinear index $\alpha$. The nonlinear index $\alpha$ is generally expressed by $$\alpha = 1/\log(E10/E1)$$

using E10 and E1. E10 is the voltage developed across a varistor when a current flow of 10 mA is conducted therethrough. E1 is the voltage developed across a varistor when a current flow of 1 mA is conducted therethrough. The above-referred JP-A 45559/1991 is not successful in producing from a common composition varistors having a satisfactory nonlinear index $\alpha$ over a broad voltage region. In one exemplary situation, varistors are fabricated by controlling heat treating temperature such that a varistor voltage E10 may fall within the range between 2 V and 20 V. A certain semiconductor ceramic material can provide a satisfactory $\alpha$ when E10 is approximately 2 V, but not when E10 is approximately 20 V. Inversely, another semiconductor ceramic material can provide a satisfactory $\alpha$ when E10 is approximately 20 V, but not when E10 is approximately 2 V. Therefore, when it is desired to change the E10 value of varistors of JP-A 45559/1991 in the range from 2 V to 20 V by setting the heat treating temperature at different levels, a plurality of different semiconductor ceramic compositions must be furnished. Also, the varistors of JP-A 45559/1991 were difficult to fabricate because E10 is sensitive to a change of heat treating temperature, which suggests that the heat treating temperature must be strictly controlled in order to achieve a target E10 value.

SUMMARY OF THE INVENTION

Therefore, an object of the present invention is to provide a voltage-dependent nonlinear resistor (or varistor) ceramic composition which ensures a satisfactory nonlinear index $\alpha$ in a wide range of varistor voltage when the varistor voltage at which resistance drops abruptly is controlled by changing a heat treating or re-oxidizing temperature without changing the composition, and which features reduced dependency of varistor voltage on a change of heat treating temperature and easy control of temperature upon heat treatment.

According to the invention, there is provided a voltage-dependent nonlinear resistor ceramic composition consisting essentially of first to fourth components (1) to (4) defined below. Component (1) is 85 to 99.997 mol % of an oxide of the formula:

$\{Sr_{(1-x-y)}Ba_xCa_y\}_zTiO_3$ wherein x, y, and z representative of molar ratios are $0.3 < x \leq 0.9$, $0.1 \leq y \leq 0.5$, $x+y \leq 1$, and $0.84 < z < 1.16$. Component (2) is 0.001 to 5.000 mol % of at least one oxide selected from the group consisting of oxides of niobium, tantalum, tungsten, manganese, and R wherein R is selected from yttrium and lanthanides, calculated as $Nb_2O_5$, $Ta_2O_5$, $WO_3$, $MnO$, and $R_2O_3$, respectively. The last-mentioned $R_2O_3$ is replaced by $R_6O_{11}$ when R is Pr or $RO_2$ when R is Ce. Component (3) is 0.001 to 5.000 mol % of $SiO_2$. Component (4) is 0.001 to 5.000 mol % of magnesium oxide calculated as MgO.

In one preferred embodiment, the composition has nonlinear indexes $\alpha 2$, $\alpha 5$, $\alpha 10$, and $\alpha 20$ when E10 at 20° C. is 2 V, 5 V, 10 V, and 20 V, respectively, wherein $\alpha 2$ is at least 2.0, $\alpha 5$ is at least 3.0, $\alpha 10$ is at least 3.5, and $\alpha 20$ is at least 4.0.

BRIEF DESCRIPTION OF THE DRAWINGS

These and further features of the present invention will be apparent with reference to the following description and drawings, wherein.

DETAILED DESCRIPTION OF THE INVENTION

Figure 1:
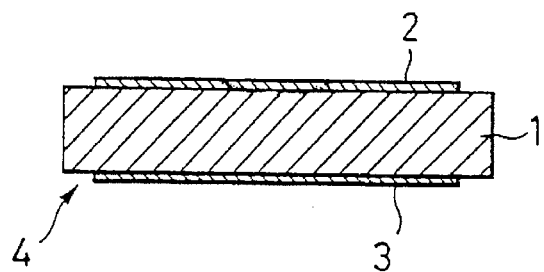
FIG. 1 is a schematic cross-section of a varistor.

The voltage-dependent nonlinear resistor ceramic composition of the invention consists essentially of first to fourth components (1) to (4) defined below. The first component is a main component of the composition, the second component is a metal oxide contributing to semiconductive nature, the third component contributes to an increase of $\alpha$ value and an improvement in sinterability, and the fourth component functions to increase a nonlinear index $\alpha$ and reduce the dependency of varistor voltage upon heat treating temperature.

The first component (1) is an oxide of the formula:

$$\{Sr_{(1-x-y)}Ba_xCa_y\}_zTiO_3$$

wherein x, y, and z representative of molar ratios are
$0.3 < x \leq 0.9$,
$0.1 \leq y \leq 0.5$,
$x+y \leq 1$, and
$0.84 < z < 1.16$.
It is contained in an amount of 85 to 99.997 mol %.

The second component (2) is at least one oxide selected from the group consisting of oxides of niobium (Nb), tantalum (Ta), tungsten (W), manganese (Fin), and R wherein R is selected from yttrium and lanthanides. The lanthanides include La, Ce, Pr, Nd, Sm, Eu, Gd, Tb, Dy, Ho, Er, Tm, Yb, and Lu. The second oxide is contained in an amount of 0.001 to 5.000 mol %. This content is given when the oxides of niobium, tantalum, tungsten, and manganese are calculated as $Nb_2O_5$, $Ta_2O_5$, $WO_3$, and MnO, respectively. The oxides of R are calculated as $Y_2O_3$, $La_2O_3$, $CeO_2$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$, respectively.

The third component (3) is $SiO_2$ which is contained in an amount of 0.001 to 5.000 mol %.

The fourth component (4) is magnesium oxide which is contained in an amount of 0.001 to 5.000 mol % calculated as MgO.

Inclusion of components (1) to (4) in the above-defined contents ensures a satisfactory nonlinear index $\alpha$ over a wide range of varistor voltage and ease of temperature control upon heat treatment, resulting in an improved production yield.

The total of components (1) to (4) is 100 mol % in the foregoing description although the ceramic composition of the invention may contain other elements such as trace additives and incidental impurities. Such other elements include Fe, Na, P, Al, and K and they are generally present as oxides.

The ceramic composition of the invention is a polycrystalline material in which grains are perovskite crystals based on component (1). The remaining components are partially incorporated in the perovskite crystals as an intragranular solid solution and partially present as oxides or composite oxides at the grain boundary. More specifically, Ba, Ca, Sr, Ti, Nb, Ta, Y and lanthanides are often present within grains whereas W, Mn, Si, and Mg are often present at the grain boundary. Often, the ceramic composition of the invention has a mean grain size of about 1 to 10 μm, especially about 2 to 6 μm.

In the practice of the invention, the ceramic composition of the invention is obtained from powder stocks through mixing, calcining, milling, compacting, reductive firing, and re-oxidizing steps.

The powder stocks used herein are powdery compounds corresponding to the respective components. The powder source materials may be oxides or compounds capable of converting into oxides upon firing, for example, carbonates and hydroxides. For example, the source materials which can be used for component (4) include magnesium compounds such as $MgCO_3$, $MgTi_2O_5$, $Mg_2TiO_4$, $Mg_2SiO_4$, $MgSiO_3$, MgO, $MgCl_2$, $Mg(OH)_2$, $Mg(NO_3)_2$, and alkoxides, typically $(CH_3O)_2Mg$. The powder stocks generally have a mean particle size of about 0.2 to 5 μm.

The powder stocks are weighed such that the resulting mixture may eventually form a composition within the scope of the invention, followed by wet mixing. The mixture is dewatered, dried, and calcined at about 1,080° to 1,250° C. for about 2 to 4 hours. The calcined product is ground, an organic binder is added thereto, and water, pH adjuster, and humectant are added further. After mixing, the mixture is compacted, burnt out for binder removal, and fired in a reducing atmosphere at about 1,250° to 1,380° C. for about 2 to 4 hours, yielding a semiconductor ceramic block. It is noted that powder stocks for components (3) and (4) may be added in the mixing step subsequent to calcination.

The thus obtained semiconductor ceramic block is subject to heat treatment or re-oxidation in an oxidizing atmosphere, typically air so as to establish an appropriate varistor voltage for a particular application. The heat treatment forms an insulating layer at the surface. It is this insulating layer that develops varistor characteristics. The nonlinear index $\alpha$ and varistor voltage increase as the insulating layer becomes thicker. A thinner insulating layer gives a less nonlinear index $\alpha$ and varistor voltage. Depending on the characteristics required on a particular product, heat treating conditions may be properly selected so as to form an insulating layer of an appropriate thickness.

After the heat treatment, electrodes are applied to opposed major surfaces of the ceramic block, completing a varistor.

EXAMPLE

Examples of the present invention are given below by way of illustration and not by way of limitation.

Example 1

Comparison in terms of component (4) content

Stock materials $SrCO_3$, $BaCO_3$, $CaCO_3$, $TiO_2$, $Nb_2O_5$, $SiO_2$, and $MgCO_3$ were weighed such that they might meet the composition shown in Table 1 (the sum of components (1) to (4) is 100 mol %) when they were converted into oxides. They were blended, milled for 10 to 20 hours in a ball mill, dewatered, and dried. The mixture was calcined at 1,100° C., crushed, milled again in a ball mill for 10 to 20 hours, dewatered, and dried. Then 1.0 to 1.5% by weight based on the mixture of polyvinyl alcohol as an organic binder was added to the mixture, which was granulated and compacted under a pressure of 2 t/cm² into a compact having a diameter of 7 mm and a thickness of 1 mm.

The compact was burnt out to remove the binder and then fired in a reducing atmosphere of 95 vol % $N_2$ and 5 vol % $H_2$ at about 1,350° C. for 4 hours, obtaining a semiconductor ceramic block. The ceramic block was then heat treated in air or an oxidizing atmosphere for 4 hours at a selected temperature in the range of 700° to 1,000° C. By changing the treating temperature, there were obtained varistors having different electrical properties including E10 and nonlinear index $\alpha$. For each composition, there were produced four varistor blocks having different E10 values, that is, E10 values of 2 V, 5 V, 10 V and 20 V at 20° C.

As shown in the cross-sectional view of FIG. 1, silver paste was applied to opposed major surfaces of the varistor block 1 and baked at 600° C. to form silver electrodes 2 and 3 having a diameter of 5 mm, obtaining a varistor sample 4.

Figure 2:
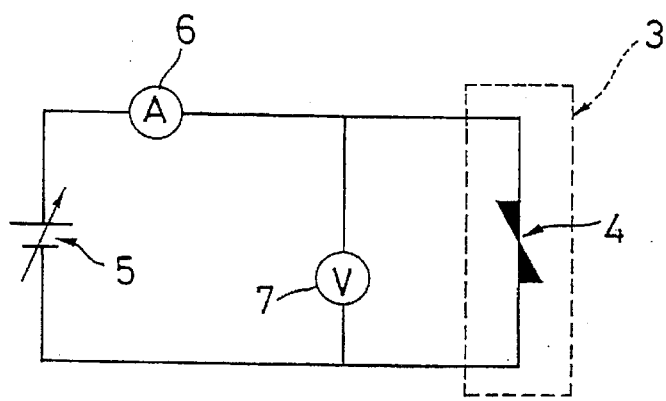
FIG. 2 is a diagram showing a circuit used in measuring the voltage across a varistor at a given current.

From the E1 at 20° C. and E10 at 20° C. of each sample, a nonlinear index $\alpha$ was calculated in accordance with the following expression (1):

$$\alpha = \log(I_{10}/I_1)/\log(E10/E1) = 1/\log(E10/E1) \quad (1)$$

wherein $I_1$ and $I_{10}$ are values of current flow conducted through the varistor upon measurement of E1 and E10 and equal to 1 mA and 10 mA, respectively. It is noted that E1 and E10 were measured using a circuit as shown in FIG. 2.

In this measurement circuit, an ampere meter 6 is connected between the varistor 4 and a DC constant current supply 5 and a voltmeter 7 is connected parallel to the varistor 4. E1 and E10 are voltages developed across the varistor 4 when a current flow of 1 mA and 10 mA was conducted through the varistor 4, respectively.

The results are shown in Table 1. In Table 1, $\alpha 2$, $\alpha 5$, $\alpha 10$, and $\alpha 20$ are nonlinear indexes when E10 at 20° C. is 2 V, 5 V, 10 V and 20 V, respectively.

From each sample whose varistor voltage E10 was equal to 10 V, a temperature coefficient of varistor voltage $\Delta$E10T was determined in accordance with the following expression (2):

$$\Delta E10T = \{E10(85) - E10(20)\}/E10(20)/(85-20) \times 100\%/°C. \quad (2)$$

wherein E10 (20) and E10 (85) are E10 at a temperature of 20° C. and 85° C., respectively. E10 (20) and E10 (85) were measured using a constant temperature tank. The results are also shown in Table 1.

about 4.0. These ranges of $\alpha$ are thus preferable. In Table 1, those values of $\alpha 2$, $\alpha 5$, $\alpha 10$, and $\alpha 20$ which are below the preferred ranges have attached thereto asterisks (**), indicating that those values are below the standard. Sample Nos. 12 to 19 wherein MgO as component (4) is added in an amount of 0.001 to 5 mol % have all values of $\alpha 2$, $\alpha 5$, $\alpha 10$, and $\alpha 20$ falling within the preferred ranges. These samples have a temperature coefficient $\Delta$E10T in the range of +0.25 to +0.36, indicating good temperature properties. That is, the varistor voltage increases with a temperature rise. In contrast, sample No. 20 whose MgO content is in excess of the range of the invention fails to achieve the advantages of the invention.

Figure 3:
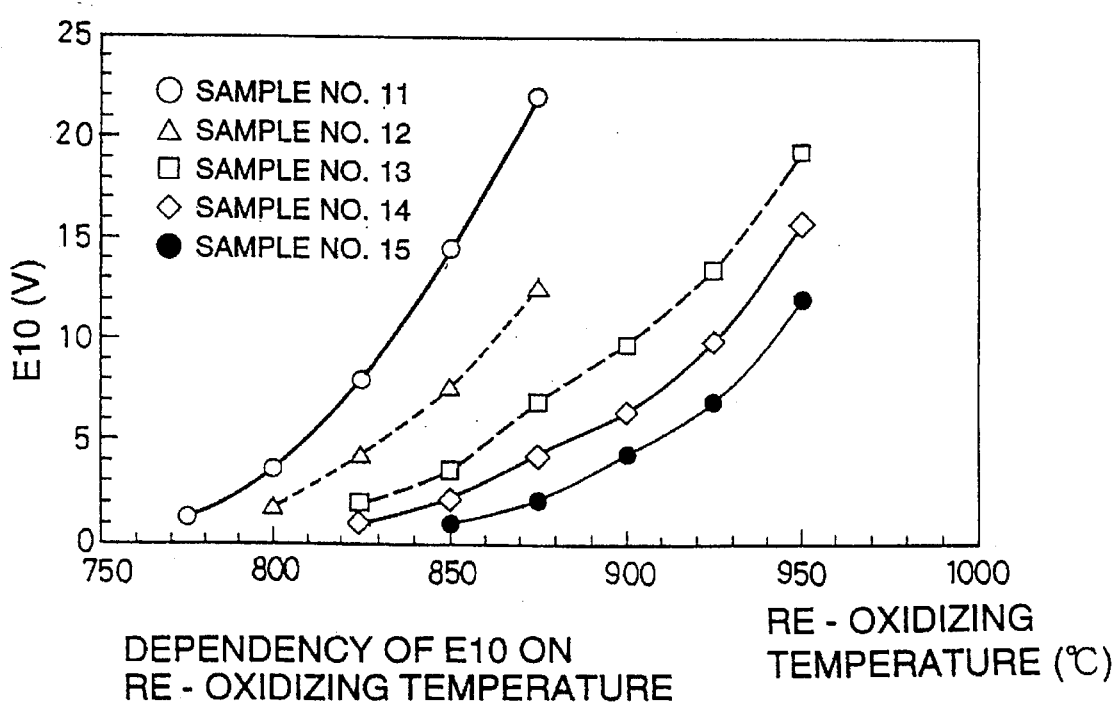
FIG. 3 is a graph showing E10 as a function of heat treating or re-oxidizing temperature.

FIG. 3 is a graph showing E10 as a function of heat treating or re-oxidizing temperature. Several semiconductor ceramic compositions selected from Table 1 were heat treated at different temperatures and measured for E10. In the graph, E10 vs. temperature curves bear sample Nos. corresponding to their composition. These curves indicate that a rate of increase of E10 per temperature rise decreases

TABLE 1

| Sample No. | Component (1) $(Sr_{(1-x-y)}Ba_xCa_y)_zTiO_3$ | | | Component (2) | | Component (3) | | Component (4) | | Electrical properties | | | | |
|---|---|---|---|---|---|---|---|---|---|---|---|---|---|---|
| | | | | | | | | | | $\alpha_2$ E10 = 2 V | $\alpha_5$ E10 = 5 V | $\alpha_{10}$ E10 = 10 V | $\alpha_{20}$ E10 = 20 V | $\Delta$E10T |
| | x | y | z | Material | mol % | Material | mol % | Material | mol % | | | | | (%/°C.) |
| 1 comp. | 0.3* | 0.2 | 1.00 | $Nb_2O_5$ | 0.1 | $SiO_2$ | 0.1 | — | — | 1.6** | 2.3** | 2.7** | 3.0** | −0.10 |
| 2 comp. | 0.5 | 0.2 | 1.00 | $Nb_2O_5$ | 0.1 | $SiO_2$ | 0.1 | — | — | 1.8** | 2.6** | 3.2** | 3.5** | +0.03 |
| 3 comp. | 0.7 | 0.2 | 1.00 | $Nb_2O_5$ | 0.1 | $SiO_2$ | 0.1 | — | — | 1.5** | 2.5** | 3.0** | 3.2** | +0.14 |
| 4 comp. | 0.9 | 0.05* | 1.00 | $Nb_2O_5$ | 0.1 | $SiO_2$ | 0.1 | — | — | 1.0** | 1.7** | 2.2** | 2.3** | +0.17 |
| 5 comp. | 1.0 | 0* | 1.00 | $Nb_2O_5$ | 0.1 | $SiO_2$ | 0.1 | — | — | 1.3** | 2.0** | 2.4** | 2.7** | +1.27 |
| 6 comp. | 0.5 | 0.1 | 1.00 | $Nb_2O_5$ | 0.1 | $SiO_2$ | 0.1 | — | — | 1.7** | 2.7** | 3.3** | 3.6** | +0.53 |
| 7 comp. | 0.5 | 0.3 | 1.00 | $Nb_2O_5$ | 0.1 | $SiO_2$ | 0.1 | — | — | 1.6** | 2.6** | 3.3** | 3.5** | +0.06 |
| 8 comp. | 0.4 | 0.5 | 1.00 | $Nb_2O_5$ | 0.1 | $SiO_2$ | 0.1 | — | — | 1.4** | 2.3** | 3.0** | 3.3** | +0.04 |
| 9 comp. | 0.4 | 0.2 | 1.00 | — | — | $SiO_2$ | 0.1 | — | — | not semiconductive | | | | |
| 10 comp. | 0.4 | 0.2 | 1.00 | $Nb_2O_5$ | 0.1 | — | — | — | — | not sintered | | | | |
| 11 comp. | 0.4 | 0.2 | 1.00 | $Nb_2O_5$ | 0.1 | $SiO_2$ | 0.1 | — | — | 1.5** | 2.7** | 3.5 | 3.8** | +0.37 |
| 12 | 0.4 | 0.2 | 1.00 | $Nb_2O_5$ | 0.1 | $SiO_2$ | 0.1 | MgO | 0.001 | 2.0 | 3.1 | 3.5 | 4.0 | +0.36 |
| 13 | 0.4 | 0.2 | 1.00 | $Nb_2O_5$ | 0.1 | $SiO_2$ | 0.1 | MgO | 0.01 | 2.1 | 3.2 | 3.6 | 4.0 | +0.33 |
| 14 | 0.4 | 0.2 | 1.00 | $Nb_2O_5$ | 0.1 | $SiO_2$ | 0.1 | MgO | 0.10 | 2.3 | 3.3 | 3.7 | 4.1 | +0.30 |
| 15 | 0.4 | 0.2 | 1.00 | $Nb_2O_5$ | 0.1 | $SiO_2$ | 0.1 | MgO | 0.30 | 2.5 | 3.6 | 3.9 | 4.1 | +0.30 |
| 16 | 0.4 | 0.2 | 1.00 | $Nb_2O_5$ | 0.1 | $SiO_2$ | 0.1 | MgO | 0.50 | 2.8 | 3.8 | 4.3 | 4.4 | +0.29 |
| 17 | 0.4 | 0.2 | 1.00 | $Nb_2O_5$ | 0.1 | $SiO_2$ | 0.1 | MgO | 1.0 | 2.8 | 3.7 | 4.2 | 4.4 | +0.25 |
| 18 | 0.4 | 0.2 | 1.00 | $Nb_2O_5$ | 0.1 | $SiO_2$ | 0.1 | MgO | 3.0 | 2.7 | 3.5 | 4.0 | 4.2 | +0.26 |
| 19 | 0.4 | 0.2 | 1.00 | $Nb_2O_5$ | 0.1 | $SiO_2$ | 0.1 | MgO | 5.0 | 2.3 | 3.2 | 3.8 | 4.0 | +0.30 |
| 20 comp. | 0.4 | 0.2 | 1.00 | $Nb_2O_5$ | 0.1 | $SiO_2$ | 0.1 | MgO | 6.0* | 1.7** | 2.7** | 3.3** | 3.6** | +0.27 |

*) outside the scope of the invention
**) below the standard

Sample Nos. 1 to 11 were free of MgO as component (4) while sample Nos. 12 to 20 contained MgO. Additionally, sample No. 9 lacked $Nb_2O_5$ as component (2) and sample No. 10 lacked $SiO_2$ as component (3). Sample Nos. 9 and 10 could not be determined for $\alpha$ and $\Delta$E10T because sample No. 9 could not be semiconductive and sample No. 10 could not be sintered.

Although varistors are desired to have a greater value of nonlinear index $\alpha$, the requirements of $\alpha$ in general applications can be met if $\alpha 2$ is equal to or greater than about 2.0, $\alpha 5$ is equal to or greater than about 3.0, $\alpha 10$ is equal to or greater than about 3.5, and $\alpha 20$ is equal to or greater than as the amount of MgO added as component (4) increases. It is thus understood that the dependency of E10 on treating temperature can be reduced by adding MgO.

Example 2

Comparison in terms of component (1) content

Varistor samples were prepared and measured as in Example 1 except that the composition was changed as shown in Table 2. The results are shown in Table 2.

TABLE 2

| Sample No. | Component (1) $(Sr_{(1-x-y)}Ba_xCa_y)_zTiO_3$ | | | Component (2) | | Component (3) | | Component (4) | | Electrical properties | | | | |
|---|---|---|---|---|---|---|---|---|---|---|---|---|---|---|
| | | | | | mol | | mol | | mol | $\alpha_2$ E10 = | $\alpha_5$ E10 = | $\alpha_{10}$ E10 = | $\alpha_{20}$ E10 = | $\Delta$E10T |
| | x | y | z | Material | % | Material | % | Material | % | 2 V | 5 V | 10 V | 20 V | (%/°C.) |
| 21 | 0.4 | 0.2 | 0.86 | $Nb_2O_5$ | 0.1 | $SiO_2$ | 0.1 | MgO | 0.5 | 2.0 | 3.1 | 3.6 | 4.1 | +0.35 |
| 22 | 0.4 | 0.2 | 0.88 | $Nb_2O_5$ | 0.1 | $SiO_2$ | 0.1 | MgO | 0.5 | 2.1 | 3.2 | 3.7 | 4.1 | +0.34 |
| 23 | 0.4 | 0.2 | 0.90 | $Nb_2O_5$ | 0.1 | $SiO_2$ | 0.1 | MgO | 0.5 | 2.2 | 3.3 | 3.9 | 4.1 | +0.33 |
| 24 | 0.4 | 0.2 | 0.92 | $Nb_2O_5$ | 0.1 | $SiO_2$ | 0.1 | MgO | 0.5 | 2.4 | 3.3 | 3.9 | 4.2 | +0.33 |
| 25 | 0.4 | 0.2 | 0.94 | $Nb_2O_5$ | 0.1 | $SiO_2$ | 0.1 | MgO | 0.5 | 2.5 | 3.4 | 4.0 | 4.2 | +0.32 |
| 26 | 0.4 | 0.2 | 0.96 | $Nb_2O_5$ | 0.1 | $SiO_2$ | 0.1 | MgO | 0.5 | 2.6 | 3.5 | 4.1 | 4.3 | +0.32 |
| 27 | 0.4 | 0.2 | 0.97 | $Nb_2O_5$ | 0.1 | $SiO_2$ | 0.1 | MgO | 0.5 | 2.7 | 3.7 | 4.2 | 4.3 | +0.30 |
| 28 | 0.4 | 0.2 | 0.98 | $Nb_2O_5$ | 0.1 | $SiO_2$ | 0.1 | MgO | 0.5 | 2.7 | 3.7 | 4.2 | 4.3 | +0.29 |
| 29 | 0.4 | 0.2 | 0.99 | $Nb_2O_5$ | 0.1 | $SiO_2$ | 0.1 | MgO | 0.5 | 2.8 | 3.8 | 4.3 | 4.4 | +0.29 |
| 30 | 0.4 | 0.2 | 1.00 | $Nb_2O_5$ | 0.1 | $SiO_2$ | 0.1 | MgO | 0.5 | 2.8 | 3.9 | 4.3 | 4.4 | +0.27 |
| 31 | 0.4 | 0.2 | 1.01 | $Nb_2O_5$ | 0.1 | $SiO_2$ | 0.1 | MgO | 0.5 | 2.9 | 3.9 | 4.4 | 4.5 | +0.25 |
| 32 | 0.4 | 0.2 | 1.02 | $Nb_2O_5$ | 0.1 | $SiO_2$ | 0.1 | MgO | 0.5 | 2.9 | 3.8 | 4.3 | 4.3 | +0.28 |
| 33 | 0.4 | 0.2 | 1.03 | $Nb_2O_5$ | 0.1 | $SiO_2$ | 0.1 | MgO | 0.5 | 2.8 | 3.7 | 4.2 | 4.3 | +0.28 |
| 34 | 0.4 | 0.2 | 1.04 | $Nb_2O_5$ | 0.1 | $SiO_2$ | 0.1 | MgO | 0.5 | 2.7 | 3.6 | 4.1 | 4.2 | +0.29 |
| 35 | 0.4 | 0.2 | 1.06 | $Nb_2O_5$ | 0.1 | $SiO_2$ | 0.1 | MgO | 0.5 | 2.7 | 3.5 | 4.0 | 4.1 | +0.31 |
| 36 | 0.4 | 0.2 | 1.08 | $Nb_2O_5$ | 0.1 | $SiO_2$ | 0.1 | MgO | 0.5 | 2.6 | 3.5 | 3.8 | 4.1 | +0.33 |
| 37 | 0.4 | 0.2 | 1.10 | $Nb_2O_5$ | 0.1 | $SiO_2$ | 0.1 | MgO | 0.5 | 2.5 | 3.3 | 3.7 | 4.0 | +0.36 |
| 38 | 0.4 | 0.2 | 1.12 | $Nb_2O_5$ | 0.1 | $SiO_2$ | 0.1 | MgO | 0.5 | 2.4 | 3.2 | 3.6 | 4.0 | +0.37 |
| 39 | 0.4 | 0.2 | 1.14 | $Nb_2O_5$ | 0.1 | $SiO_2$ | 0.1 | MgO | 0.5 | 2.3 | 3.0 | 3.5 | 4.0 | +0.37 |

In the samples of Table 2, the value of z in component (1) is altered. Since z values are within the range of the invention, these samples have all values of $\alpha 2$, $\alpha 5$, $\alpha 10$, and $\alpha 20$ falling within the preferred ranges. They also have a temperature coefficient $\Delta$E10T in the range of +0.25 to +0.37. Among others, those samples wherein z is within the more preferred range of 0.86 to 1.10 have a temperature coefficient $\Delta$E10T in the range of +0.25 to +0.36, that is, better temperature properties.

Example 3

Varistor samples were prepared and measured as in Example 1 except that the composition was changed as shown in Tables 3 to 5. The samples were determined for $\alpha 10$. The results are shown in Tables 3 to 5.

TABLE 3

| Sample No. | Component (1) $(Sr_{(1-x-y)}Ba_xCa_y)_zTiO_3$ | | | Component (2) | | Component (3) | | Component (4) | | Electrical properties $\alpha_{10}$ |
|---|---|---|---|---|---|---|---|---|---|---|
| | x | y | z | Material | mol % | Material | mol % | Material | mol % | E10 = 10 V |
| 101 comp. | 0.30* | 0.51* | 1.03 | $Nb_2O_5$ | 0.50 | $SiO_2$ | 0.30 | MgO | 0.50 | 3.1** |
| 102 | 0.31 | 0.50 | 1.03 | $Nb_2O_5$ | 0.50 | $SiO_2$ | 0.30 | MgO | 0.50 | 3.6 |
| 103 | 0.40 | 0.20 | 1.03 | $Nb_2O_5$ | 0.50 | $SiO_2$ | 0.30 | MgO | 0.50 | 4.2 |
| 104 | 0.50 | 0.20 | 1.03 | $Nb_2O_5$ | 0.50 | $SiO_2$ | 0.30 | MgO | 0.50 | 3.8 |
| 105 | 0.90 | 0.10 | 1.03 | $Nb_2O_5$ | 0.50 | $SiO_2$ | 0.30 | MgO | 0.50 | 3.5 |
| 106 comp. | 1.00* | 0* | 1.03 | $Nb_2O_5$ | 0.50 | $SiO_2$ | 0.30 | MgO | 0.50 | 2.8** |
| 107 comp. | 0.40 | 0.30 | 0.84* | $Nb_2O_5$ | 0.50 | $SiO_2$ | 0.30 | MgO | 0.50 | 3.0** |
| 108 | 0.40 | 0.30 | 0.85 | $Nb_2O_5$ | 0.50 | $SiO_2$ | 0.30 | MgO | 0.50 | 3.5 |
| 109 | 0.40 | 0.30 | 0.93 | $Nb_2O_5$ | 0.50 | $SiO_2$ | 0.30 | MgO | 0.50 | 4.0 |
| 110 | 0.40 | 0.30 | 1.01 | $Nb_2O_5$ | 0.50 | $SiO_2$ | 0.30 | MgO | 0.50 | 4.0 |
| 111 | 0.40 | 0.30 | 1.10 | $Nb_2O_5$ | 0.50 | $SiO_2$ | 0.30 | MgO | 0.50 | 4.2 |
| 112 | 0.40 | 0.30 | 1.15 | $Nb_2O_5$ | 0.50 | $SiO_2$ | 0.30 | MgO | 0.50 | 3.7 |
| 113 comp. | 0.40 | 0.30 | 1.16* | $Nb_2O_5$ | 0.50 | $SiO_2$ | 0.30 | MgO | 0.50 | 3.0** |

*) outside the scope of the invention
**) below the standard

TABLE 4

| Sample No. | Component (1) $\{Sr_{(1-x-y)}Ba_xCa_y\}_zTiO_3$ x | y | z | Component (2) Material | mol % | Component (3) Material | mol % | Component (4) Material | mol % | Electrical properties $\alpha_{10}$ E10 = 10 V |
|---|---|---|---|---|---|---|---|---|---|---|
| 114 comp. | 0.40 | 0.30 | 1.03 | $Nb_2O_5$ | 6.00* | $SiO_2$ | 5.00 | MgO | 6.00* | 3.0** |
| 115 | 0.40 | 0.30 | 1.03 | $Nb_2O_5$ | 5.00 | $SiO_2$ | 5.00 | MgO | 5.00 | 3.6 |
| 116 | 0.40 | 0.30 | 1.03 | $Nb_2O_5$ | 3.00 | $SiO_2$ | 3.00 | MgO | 4.00 | 3.8 |
| 117 | 0.40 | 0.30 | 1.03 | $Nb_2O_5$ | 1.50 | $SiO_2$ | 1.50 | MgO | 2.00 | 4.1 |
| 118 | 0.40 | 0.30 | 1.03 | $Nb_2O_5$ | 0.001 | $SiO_2$ | 0.001 | MgO | 0.001 | 3.6 |
| 119 comp. | 0.40 | 0.30 | 1.03 | — | — | — | — | — | — | not sintered |
| 120 comp. | 0.40 | 0.30 | 1.03 | — | — | $SiO_2$ | 0.30 | MgO | 0.50 | not sintered |
| 121 | 0.40 | 0.30 | 1.03 | $Ta_2O_5$ | 0.50 | $SiO_2$ | 0.30 | MgO | 0.50 | 4.0 |
| 122 | 0.40 | 0.30 | 1.03 | $WO_3$ | 0.30 | $SiO_2$ | 0.30 | MgO | 0.50 | 3.9 |
| 123 | 0.40 | 0.30 | 1.03 | MnO | 0.50 | $SiO_2$ | 0.30 | MgO | 0.50 | 3.8 |
| 124 | 0.40 | 0.30 | 1.03 | $Y_2O_3$ | 0.20 | $SiO_2$ | 0.30 | MgO | 0.50 | 3.9 |
| 125 | 0.40 | 0.30 | 1.03 | $La_2O_3$ | 0.40 | $SiO_2$ | 0.30 | MgO | 0.50 | 4.1 |
| 126 | 0.40 | 0.30 | 1.03 | $CeO_2$ | 1.00 | $SiO_2$ | 0.30 | MgO | 0.50 | 4.0 |
| 127 | 0.40 | 0.30 | 1.03 | $Nd_2O_3$ | 0.50 | $SiO_2$ | 0.30 | MgO | 0.50 | 3.8 |
| 128 | 0.40 | 0.30 | 1.03 | $Pr_6O_{11}$ | 0.60 | $SiO_2$ | 0.30 | MgO | 0.50 | 4.0 |
| 129 comp. | 0.40 | 0.30 | 1.03 | $Pr_6O_{11}$ | 6.00* | $SiO_2$ | 0.30 | MgO | 0.50 | 2.8** |

*) outside the scope of the invention
**) below the standard

TABLE 5

| Sample No. | Component (1) $\{Sr_{(1-x-y)}Ba_xCa_y\}_zTiO_3$ x | y | z | Component (2) Material | mol % | Component (3) Material | mol % | Component (4) Material | mol % | Electrical properties $\alpha_{10}$ E10 = 10 V |
|---|---|---|---|---|---|---|---|---|---|---|
| 130 comp. | 0.40 | 0.30 | 1.03 | $Nb_2O_5$ | 0.50 | — | — | MgO | 0.50 | not sintered |
| 131 | 0.40 | 0.30 | 1.03 | $Nb_2O_5$ | 0.50 | $SiO_2$ | 0.001 | MgO | 0.50 | 3.6 |
| 132 | 0.40 | 0.30 | 1.03 | $Nb_2O_5$ | 0.50 | $SiO_2$ | 0.50 | MgO | 0.50 | 4.1 |
| 133 | 0.40 | 0.30 | 1.03 | $Nb_2O_5$ | 0.50 | $SiO_2$ | 3.00 | MgO | 0.50 | 4.0 |
| 134 | 0.40 | 0.30 | 1.03 | $Nb_2O_5$ | 0.50 | $SiO_2$ | 5.00 | MgO | 0.50 | 3.7 |
| 135 comp. | 0.40 | 0.30 | 1.03 | $Nb_2O_5$ | 0.50 | $SiO_2$ | 5.50* | MgO | 0.50 | 3.0** |
| 136 comp. | 0.40 | 0.30 | 1.03 | $Nb_2O_5$ | 0.50 | $SiO_2$ | 0.30 | — | — | 2.9** |
| 137 | 0.40 | 0.30 | 1.03 | $Nb_2O_5$ | 0.50 | $SiO_2$ | 0.30 | MgO | 0.001 | 3.5 |
| 138 | 0.40 | 0.30 | 1.03 | $Nb_2O_5$ | 0.50 | $SiO_2$ | 0.30 | MgO | 0.50 | 4.3 |
| 139 | 0.40 | 0.30 | 1.03 | $Nb_2O_5$ | 0.50 | $SiO_2$ | 0.30 | MgO | 3.00 | 4.1 |
| 140 | 0.40 | 0.30 | 1.03 | $Nb_2O_5$ | 0.50 | $SiO_2$ | 0.30 | MgO | 5.00 | 3.7 |
| 141 comp. | 0.40 | 0.30 | 1.03 | $Nb_2O_5$ | 0.50 | $SiO_2$ | 0.30 | MgO | 6.00* | 3.0** |

*) outside the scope of the invention
**) below the standard

It is evident from these Tables that $\alpha$ values within the preferred ranges are obtained insofar as the type and content of the respective components are within the scope of the invention.

There has been described a voltage-dependent nonlinear resistor (or varistor) ceramic composition having greater values of nonlinear index $\alpha$. When the varistor voltage at which resistance drops abruptly is controlled by changing a heat treating or re-oxidizing temperature without changing the composition, a satisfactory nonlinear index $\alpha$ is available over a wide range of varistor voltage. Since practically acceptable values of $\alpha$ over a wide range of varistor voltage are available from a single composition, there is no need to furnish a variety of materials. This leads to easy management of materials.

According to the invention, the dependency of varistor voltage on heat treating temperature is reduced. This leads to easy control of temperature upon heat treatment. This also minimizes shifting of varistor voltage by a temperature variation upon heat treatment, leading to improved production yields.

Although some preferred embodiments have been described, many modifications and variations may be made thereto in the light of the above teachings. It is therefore to be understood that within the scope of the appended claims, the invention may be practiced otherwise than as specifically described.

We claim:
1. A voltage-dependent nonlinear resistor ceramic composition consisting essentially of
(1) 85 to 99.997 mol % of an oxide of the formula:

$\{Sr_{(1-x-y)}Ba_xCa_y\}_zTiO_3$ wherein x, y, and z representative of molar ratios are
$0.3 < x \leq 0.9$,
$0.1 \leq y \leq 0.5$,
$x+y \leq 1$, and
$0.84 < z < 1.16$, (2) 0.001 to 5.000 mol % of at least one oxide selected from the group consisting of oxides of niobium, tantalum, tungsten, manganese, and R wherein R is selected from yttrium and lanthanides, calculated as $Nb_2O_5$, $Ta_2O_5$, $WO_3$, MnO, and $R_2O_3$, respectively, the last-mentioned $R_2O_3$ being replaced by $R_6O_{11}$ when R is Pr or $RO_2$ when R is Ce, (3) 0.001 to 5.000 mol % of $SiO_2$, and (4) 0.001 to 5.000 mol % of magnesium oxide calculated as MgO.

2. The composition of claim 1 having nonlinear indexes $\alpha 2$, $\alpha 5$, $\alpha 10$, and $\alpha 20$ when the voltage E10 developed upon conduction of a current flow of 10 mA at 20° C. is 2 V, 5 V, 10 V, and 20 V, respectively, wherein $\alpha 2$ is at least 2.0, $\alpha 5$ is at least 3.0, $\alpha 10$ is at least 3.5, and $\alpha 20$ is at least 4.0.

* * * * *